(12) United States Patent
Lin et al.

(10) Patent No.: US 10,328,513 B2
(45) Date of Patent: Jun. 25, 2019

(54) WELDING PROCESS, WELDING SYSTEM, AND WELDED ARTICLE

(71) Applicant: GENERAL ELECTRIC COMPANY, Schenectady, NY (US)

(72) Inventors: Dechao Lin, Greer, SC (US); Srikanth Chandrudu Kottilingam, Simpsonville, SC (US); Yan Cui, Greer, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1138 days.

(21) Appl. No.: 13/907,031

(22) Filed: May 31, 2013

(65) Prior Publication Data

US 2014/0352835 A1    Dec. 4, 2014

(51) Int. Cl.
*B23K 26/20* (2014.01)
*B23K 9/00* (2006.01)
(Continued)

(52) U.S. Cl.
CPC ............ *B23K 9/0052* (2013.01); *B23K 26/20* (2013.01); *B23K 26/348* (2015.10); *B23K 28/02* (2013.01); *F16L 9/02* (2013.01)

(58) Field of Classification Search
CPC .... B23K 26/1429; B23K 26/20; B23K 28/02; B23K 9/0052; B23K 2201/001;
(Continued)

(56) References Cited

U.S. PATENT DOCUMENTS

| 4,078,167 A | 3/1978 | Banas et al. |
| 4,089,608 A | 5/1978 | Hoadley |

(Continued)

FOREIGN PATENT DOCUMENTS

| CN | 202199938 U | 4/2012 |
| EP | 1104582 A1 | 6/2001 |

(Continued)

OTHER PUBLICATIONS

Unofficial English Translation of Chinese Office Action issued in connection with corresponding CN Application No. 201410236954.2 dated Sep. 28, 2016.

(Continued)

*Primary Examiner* — Tu B Hoang
*Assistant Examiner* — Masahiko Muranami
(74) *Attorney, Agent, or Firm* — McNees Wallace & Nurick LLC

(57) ABSTRACT

A welding process, welding system and welded article are disclosed. The welding process includes generating a first beam from a stationary fusion apparatus and generating a second beam from a rotatable fusion apparatus. The first beam and the second beam form a weld in an article. The welding system includes a stationary fusion apparatus and a rotatable fusion apparatus directed at an article to be welded, the stationary fusion apparatus and rotatable fusion apparatus being arranged and disposed to form a single weld in the article. The welded article includes a first element welded to a second element, the welded article having a decreased root reinforcement, in an inaccessible region, from that of a hybrid stationary fusion apparatus.

17 Claims, 6 Drawing Sheets

(51) Int. Cl.
*B23K 28/02* (2014.01)
*F16L 9/02* (2006.01)
*B23K 26/348* (2014.01)

(58) Field of Classification Search
CPC .............. B23K 26/042; B23K 26/0884; B23K 26/1438; B23K 26/242; B23K 26/70; B23K 9/32; B23K 26/064; B23K 26/0643; B23K 26/0648; B23K 26/348; B23K 2203/00; F16L 9/02
USPC ............ 219/121.46, 121.59, 121.64, 121.76, 219/121.45, 121.63, 136, 137, 137 R; 228/112.1; 138/177; 428/594, 619, 650, 428/934; 156/272.2
See application file for complete search history.

(56) References Cited

U.S. PATENT DOCUMENTS

| | | | |
|---|---|---|---|
| 4,258,246 A | 3/1981 | Karube et al. | |
| 4,501,950 A | 2/1985 | Richardson | |
| 4,689,466 A | 8/1987 | Hoshinouchi et al. | |
| 4,691,093 A * | 9/1987 | Banas | B23K 15/004 219/121.63 |
| 4,714,587 A | 12/1987 | Eylon et al. | |
| 4,997,283 A | 3/1991 | Danielson et al. | |
| 5,006,688 A | 4/1991 | Cross | |
| 5,098,484 A | 3/1992 | Eylon et al. | |
| 5,098,650 A | 3/1992 | Eylon et al. | |
| 5,115,305 A | 5/1992 | Baur et al. | |
| 5,127,019 A | 6/1992 | Epstein et al. | |
| 5,305,363 A | 4/1994 | Burke et al. | |
| 5,424,027 A | 6/1995 | Eylon | |
| 5,514,849 A | 5/1996 | Findlan et al. | |
| 5,573,683 A | 11/1996 | Findlan et al. | |
| 5,650,078 A | 7/1997 | Hamura et al. | |
| 5,653,897 A | 8/1997 | Findlan et al. | |
| 5,700,989 A | 12/1997 | Dykhno et al. | |
| 5,925,271 A * | 7/1999 | Pollack | B23K 26/02 219/121.74 |
| 5,938,955 A | 8/1999 | Ikeda et al. | |
| 5,977,513 A | 11/1999 | Findlan | |
| 6,040,550 A | 3/2000 | Chang | |
| 6,563,267 B1 | 5/2003 | Van Den Nieuwenhuizen et al. | |
| 6,647,082 B1 | 11/2003 | Yamada et al. | |
| 7,009,141 B1 | 3/2006 | Wool et al. | |
| 7,385,157 B2 * | 6/2008 | Oda | B23K 26/0608 219/121.63 |
| 7,402,954 B2 | 7/2008 | Van Den Nieuwenhuizen et al. | |
| 7,838,813 B2 | 11/2010 | Essling | |
| 7,959,297 B2 | 6/2011 | Silverstein et al. | |
| 3,031,824 A1 | 10/2011 | Bystriskii et al. | |
| 3,066,382 A1 | 11/2011 | Silverstein et al. | |
| 2002/0017509 A1 * | 2/2002 | Ishide | B23K 26/0604 219/121.63 |
| 2004/0000539 A1 * | 1/2004 | Takikawa | B23K 26/1429 219/121.64 |
| 2004/0026381 A1 * | 2/2004 | Tsukamoto | B23K 26/06 219/121.6 |
| 2005/0011868 A1 | 1/2005 | Matile et al. | |
| 2005/0140295 A1 | 6/2005 | Van Den Nieuwenhuizen | |
| 2005/0169830 A1 | 8/2005 | Richard et al. | |
| 2007/0017906 A1 | 1/2007 | Nowak et al. | |
| 2007/0084835 A1 * | 4/2007 | Dinauer | B23K 26/26 219/121.64 |
| 2008/0245774 A1 * | 10/2008 | Kim | B23K 26/0093 219/74 |
| 2009/0050609 A1 * | 2/2009 | Berger | B23K 9/1735 219/121.64 |
| 2010/0078412 A1 * | 4/2010 | Diez | B23K 26/1429 219/121.64 |
| 2010/0155381 A1 * | 6/2010 | Kuhl | B23K 26/0626 219/121.72 |
| 2010/0199972 A1 | 8/2010 | Brost | |
| 2010/0276402 A1 * | 11/2010 | Richard | B23K 9/0286 219/121.64 |
| 2011/0011078 A1 | 1/2011 | Kamen et al. | |
| 2011/0198317 A1 | 8/2011 | Lin | |
| 2012/0325786 A1 * | 12/2012 | Tolling | B23K 9/18 219/121.64 |
| 2013/0136540 A1 * | 5/2013 | Jones | B23K 31/027 405/170 |
| 2013/0316185 A1 * | 11/2013 | Evangelista | B32B 15/01 428/601 |

FOREIGN PATENT DOCUMENTS

| | | |
|---|---|---|
| JP | H08-192286 A | 7/1996 |
| JP | H09220667 A | 8/1997 |
| JP | H10-71480 A | 3/1998 |
| JP | 2000-280080 A | 10/2000 |
| JP | 2000-301338 A | 10/2000 |
| JP | 2001259847 A | 9/2001 |
| JP | 2002-224867 A | 8/2002 |
| JP | 2003-305581 A | 10/2003 |
| JP | 2004001084 A | 1/2004 |
| JP | 2004181527 A | 7/2004 |
| JP | 2006281303 A | 10/2006 |
| JP | 2008-055446 A | 3/2008 |
| JP | 2011056539 A | 3/2011 |
| JP | 2012-016745 A | 1/2012 |
| JP | 2013-056369 A | 3/2013 |
| KR | 20090066685 A | 6/2009 |
| KR | 10-2012-0076046 A | 7/2012 |
| WO | 9209863 A1 | 6/1992 |
| WO | 9215985 A1 | 9/1992 |
| WO | 0000320 A1 | 1/2000 |
| WO | 0077826 A1 | 12/2000 |
| WO | WO 2012000648 * | 1/2012 ............. B23K 26/00 |
| WO | WO 2012000648 A1 * | 1/2012 ........... B23K 1/0056 |

OTHER PUBLICATIONS

Steven G. Shi, Paul Hilton, Steve Mulligan and Geert Verhaeghe, "Hybrid Nd: YAG laser-mag welding of thick section steel with adaptive control", TWI (http://www.twi.co.uk/content/spsgsoct2004.html), p. 1-23, Oct. 2004, Cambridge UK.

"Lecture 3.3: Principles of Welding", ESDEP Lecture Note [WG3] (http://www.haiyangshiyou.com/esdep/master/wg03/t0300.htm), Nov. 22, 2010.

Moriaki Ono, Yukio Shinbo, Akihide Yoshitake and Masanori Ohmura, "Development of Laser-arc Hybrid Welding", NKK Technical Review (http://www.lac-online.nl/dfl/f/development_of_hybrid_welding.pdf), No. 86, p. 8-12 (2002).

"Lecture 3.4: Welding Processes", ESDEP Lecture Note [WG3] (http://www.haiyangshiyou.com/esdep/master/wg03/toc.htm), Nov. 22, 2010.

"Laser Welding Review", Engineers Edge Solutions by Design (http://www.engineersedge.com/manufacturing/laser_welding.htm), Jan. 2011.

J. W. Elmer, "Characterization of Defocused Electron Beams and Welds in Stainless Steel and Refractory Metals using the Enhanced Modified Faraday Cup Diagnostic", Lawrence Livermore National Laboratory, p. 1-9, Jan. 23, 2009.

"Fiber laser", Wikipedia (http://en.wikipedia.org/wiki/Fiber_laser), Mar. 29, 2006.

"Disk laser", Wikipedia (http://en.wikipedia.org/wiki/Disk_laser), Jan. 25, 2007.

Nd: YAG laser, Wikipedia (http://en.wikipedia.org/wiki/Nd:YAG_laser), Feb. 26, 2004.

Carbon dioxide laser, WIkipedia (http://en.wikipedia.org/wiki/Carbon_dioxide_laser), Nov. 17, 2008.

European Search Report and Opinion issued in connection with corresponding EP Application No. 14170082.3 dated Oct. 23, 2015.

Machine Translation and Notification of Reasons for Refusal issued in connection with corresponding JP Application No. 2014-108633 dated Apr. 3, 2018.

(56) References Cited

OTHER PUBLICATIONS

Notification of Reasons for Refusal issued in connection with corresponding JP Application No. 2014-108633 dated Oct. 23, 2018.

* cited by examiner

WELDING PROCESS, WELDING SYSTEM, AND WELDED ARTICLE

FIELD OF THE INVENTION

The present invention is directed to welding processes, welding systems, and welded articles. More specifically, the present invention is directed to hybrid welding.

BACKGROUND OF THE INVENTION

Welding is a continuously developing technology used to join elements together for a variety of intended uses. Often a welded article is used in fluid transport, where a weld can have a significant impact on fluid dynamics and fatigue life within the welded article. The size and shape of a weld that extends to an article's inner surface can determine the effect of the weld on the fluid dynamic.

One known welding process uses laser welding. Laser welding can make deeper penetration welds than arc welding because of its high-energy density. However, the small spot size of the laser beam limits the joint fit-up and can be undesirably lacking in fusion due to variations in joint gaps. Additionally, the laser welding can form a root concavity in the joint gaps of the welded article. Although the root concavity can be filled through a filler material with additional heat input, the root concavity can be difficult to access in various articles such as small pipes. Furthermore, the filler material forms a weld face reinforcement which can disrupt fluid flow within the article.

A welding process using both arc welding and laser welding can form a convex weld, or root reinforcement, protruding from the inner surface of the article. The concave weld root reinforcement from laser welding alone, and the convex weld root reinforcement from welding both disrupt fluid flow, causing turbulent flow and affecting fluid dynamics within the article. The concave and convex root reinforcements also introduce stresses that decrease a fatigue life of a joint in the article.

A welding process, welding system, and welded article not suffering from the above drawbacks would be desirable in the art.

BRIEF DESCRIPTION OF THE INVENTION

In an exemplary embodiment, a welding process includes generating a first directed weld energy from a stationary fusion apparatus, and generating a second directed weld energy from a rotatable fusion apparatus. The first directed weld energy and the second directed weld energy form a weld in an article.

In another exemplary embodiment, a welding system includes a stationary fusion apparatus, and a rotatable fusion apparatus. The stationary fusion apparatus and the rotatable fusion apparatus are arranged and disposed to form a single weld in an article to be welded.

In another exemplary embodiment, a welded article includes a first element welded to a second element. Rotation of a rotatable fusion apparatus decreases an inaccessible root reinforcement from that of a stationary fusion apparatus alone.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
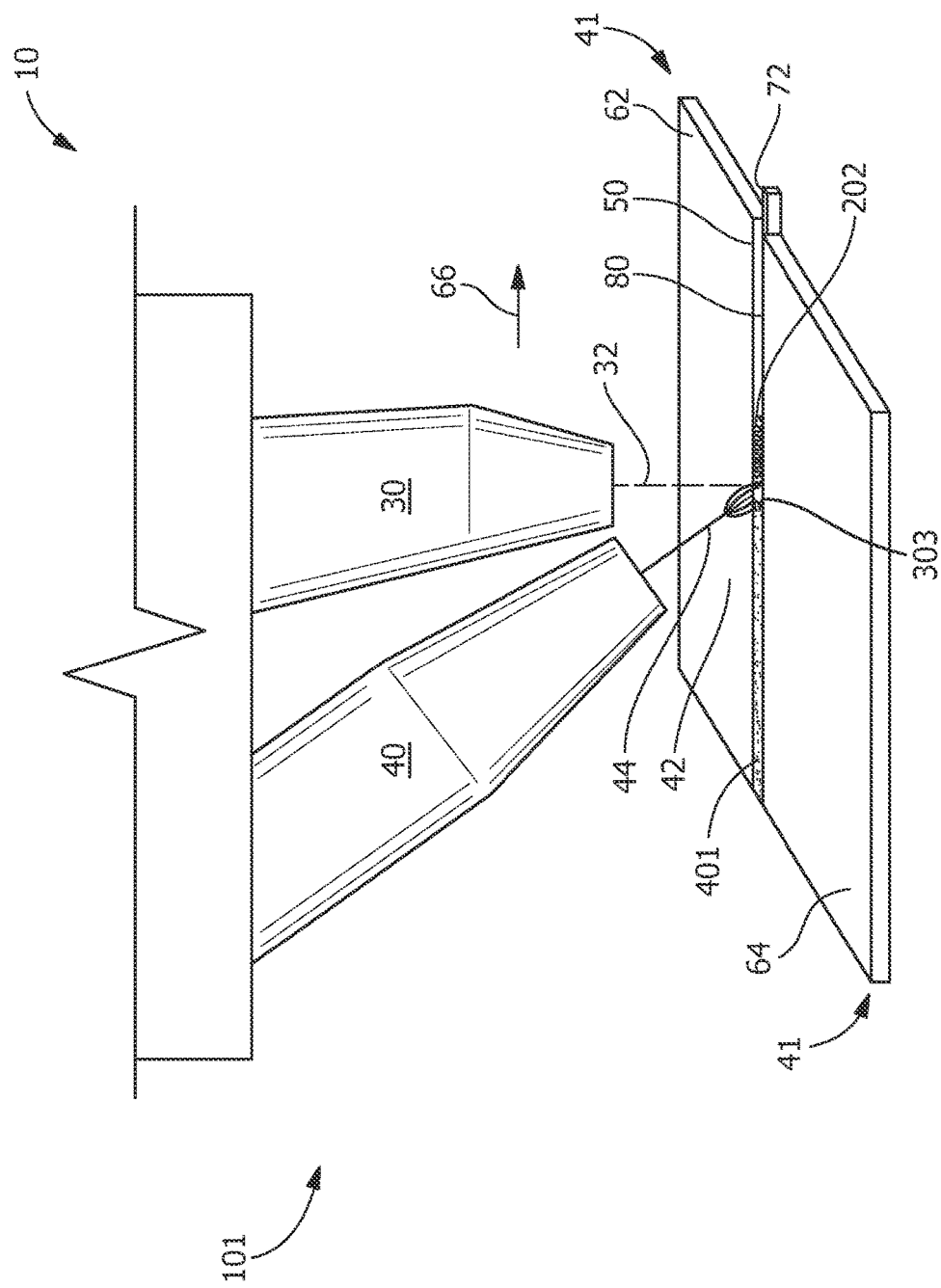
FIG. 1 is a perspective view of a welding system according to the disclosure.

Provided is an exemplary welding process, a welding system, and a welded article. Embodiments of the present disclosure, in comparison to methods and products not utilizing one or more features disclosed herein, increase consistency, decrease root reinforcement requirements, decrease required re-working, or a combination thereof Referring to FIG. 1, in one embodiment, a welding system 10 and a welding process 101 include a stationary fusion apparatus 40 such as a stationary arc welding apparatus and a rotatable fusion apparatus 30 such as a rotatable laser beam apparatus. The stationary fusion apparatus 40 emits a first directed weld energy 44, and the rotatable fusion apparatus 30 emits a second directed weld energy 32 to form a weld 401. Together, a laser head of the rotatable fusion apparatus 30 and a torch of the stationary fusion apparatus 40 form a welding head of the welding system 10. The welding head of the welding system 10 travels in a weld direction 66 to join any weldable material. Weldable materials include, but are not limited to, carbon steel, low-alloy steel, stainless steel, aluminum, magnesium, copper, copper alloys, titanium, and dissimilar metals, nickel based alloys, or a combination thereof The welding system 10 is any suitable combination of a stationary fusion apparatus 40 and a rotatable fusion apparatus 30. In one embodiment, the rotatable fusion apparatus 30 is a laser welding device. In another embodiment the stationary fusion apparatus 40 is the laser welding device, the plasma beam welding device, an electric arc welding device, a gas tungsten arc welding (TIG) device, a gas metal arc welding (MIG) device, or a combination thereof.

In one embodiment, the stationary fusion apparatus 40 and the rotatable fusion apparatus 30 are arranged and disposed to generate the first directed weld energy 44 and the second directed weld energy 32 toward an article 41. In one embodiment, the article 41 includes at least two adjacent workpieces, such as a first workpiece 62 and a second workpiece 64. The first workpiece 62 and the second workpiece 64 are components, sub-components, portions of a single component, portions of separate components, and/or other weldable elements. The first workpiece 62 and the second workpiece 64 are positioned to have a gap 50 therebetween. Alternatively, in one embodiment, the gap 50 is within the article 41, for example, as a crack, an aperture, and/or other finite feature. In one embodiment, the gap 50 is a result of parts assembly, tooling, fixturing, and/or other physical processes.

The stationary fusion apparatus 40 trails or leads the rotatable fusion apparatus 30 along the weld direction 66. A rotation path 202 of the rotatable fusion apparatus 30 extends in the weld direction 66. In an embodiment with the stationary fusion apparatus 40 trailing the rotatable fusion apparatus 30, the first directed weld energy 44 penetrates the first workpiece 62 and/or the second workpiece 64 in a direction that result in a force being applied in the weld direction 66. In an embodiment with the stationary fusion apparatus 40 leading the rotatable fusion apparatus 30, the first directed weld energy 44 penetrates the first workpiece 62 and/or the second workpiece 64 in a direction that results in a force being applied opposite of the weld direction 66.

The rotatable fusion apparatus 30, the stationary fusion apparatus 40, and a wire electrode 72 are positioned in any suitable arrangement to obtain interaction of the first directed weld energy 44 and the second directed weld energy 32 to create a stable common molten pool 303, reduce or eliminate splatter, and/or generate a stable weld arc 42. In one embodiment, the consumable wire electrode 72 is positioned adjacent a gap face 80 and forms into filler material by the interaction of the first directed weld energy 44 and the second directed weld energy 32, thereby filling, for example, a concavity in the first workpiece 62 and/or the second workpiece 64, and resulting in a convex geometry or substantially planar geometry. In another embodiment, the consumable wire electrode 72 is fed into the weld pool 303 during the weld process 101.

Figure 2:
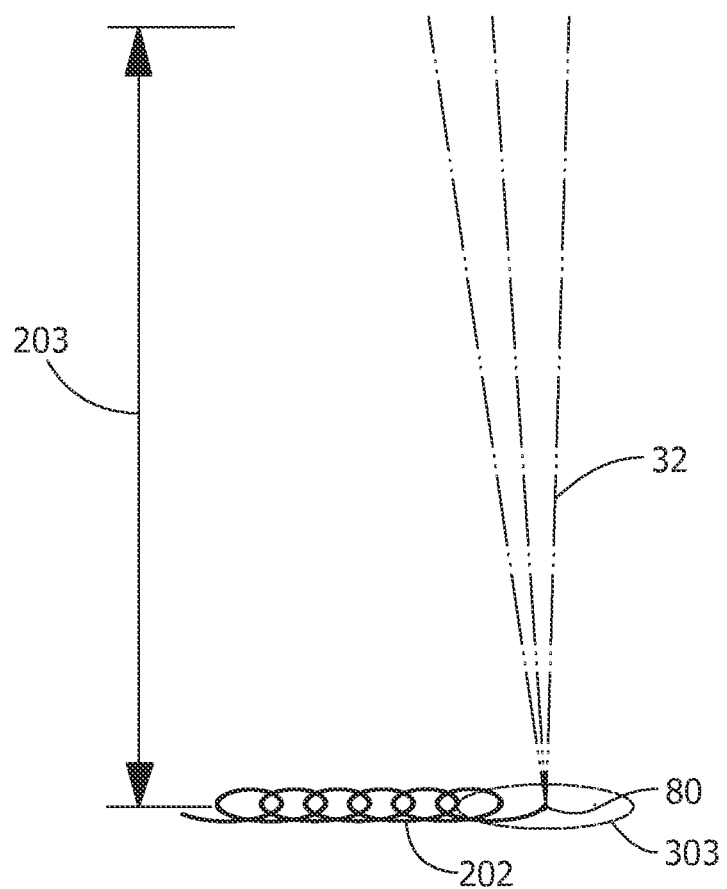
FIG. 2 is an exploded view of a rotating fusion apparatus according to the disclosure.

The rotatable fusion apparatus 30 includes rotatable features permitting the second directed weld energy 32 to be rotated. For example, referring to FIG. 2, in one embodiment, the rotatable fusion apparatus 30 is configured to generate the second directed weld energy 32 to pass through at least two members 201 and a lens 204. The lens 204 is positioned between the two members 201, and the article 41, at a focal length 203. Rotation of the at least two members 201 rotates the second directed weld energy 32 on the article 41 along the rotation path 202. As used herein, the terms "rotation," "rotate," and grammatical variations thereof, refer to a single traversal of a path.

In one embodiment, the rotatable fusion apparatus 30 includes a laser scanning mirror. Movement of the laser scanning mirror rotates the second directed weld energy 32. The laser scanning mirror rotates the second directed weld energy 32 at an increased speed as compared to the two members 201 and the lens 204. The rotation of the second directed weld energy 32 increases a weld area covered by the second directed weld energy 32. The weld area includes a portion of the article 41 which is contacted by the first directed weld energy 44 and the second directed weld energy 32.

The rotation path 202 is any suitable pattern or configuration which generates a centrifugal force in the common molten pool 303. A suitable pattern or configuration of the rotation path 202 includes, but is not limited to, being or resembling a circle, a triangle, an oval, a square, a rectangle, a trapezoid, complex geometries, or any combination thereof. In one embodiment, the rotation path 202 is controlled in a fully-automated or at least partially-automated manner, for example, capable of maintaining a substantially constant or constant rotation speed, a substantially constant or constant rotation width, and/or a substantially constant or constant rotation path 202 throughout the welding process 101. In one embodiment, the rotation path 202, including the rotation speed and/or the rotation width, is varied throughout the welding process 101. In another embodiment, the rotation path 202 is adjusted for varying joint gaps throughout the welding process. The rotation path 202 is adjusted through any suitable means, such as, but not limited to programming prior to the welding process 101, programming throughout the welding process 101, adaptive adjustments, or a combination thereof.

In one embodiment, the second directed weld energy 32 is rotated at a predetermined rate, for example, between about 10 rotations per minute and about 60,000 rotations per minute, between about 10 rotations per minute and about 10,000 rotations per minute, between about 10 rotations per minute and about 200 rotations per minute, between about 10 rotations per minute and about 150 rotations per minute, between about 15 rotations per minute and about 200 rotations per minute, between about 50 rotations per minute and about 150 rotations per minute, between about 100 rotations per minute and about 200 rotations per minute, of about 50 rotations per minute, of about 100 rotations per minute, of about 200 rotations per minute, or any suitable combination, sub-combination, range, or sub-range therein.

In one embodiment, the rotation path 202 has a predetermined width (such as, a diameter), for example, between about 0.4 mm and about 3 mm, between about 0.4 mm and about 2 mm, between about 0.4 and about 0.6 mm, between about 0.4 mm and about 0.5 mm, between about 0.5 mm and about 0.6 mm, of about 0.4 mm, of about 0.5 mm, of about 0.6 mm, of about 2 mm, of about 3 mm, or any suitable combination, sub-combination, range, or sub-range therein.

Figure 3:
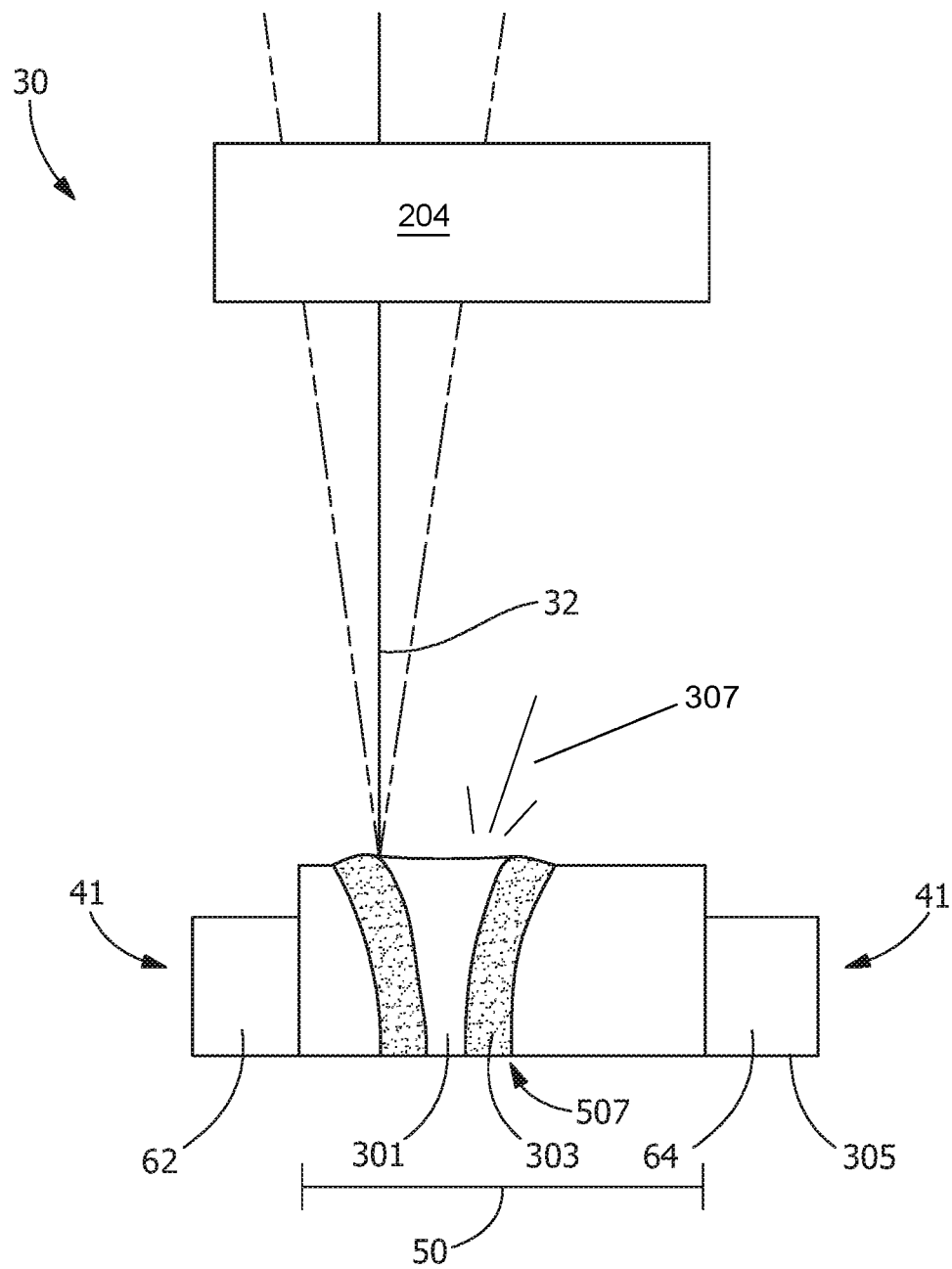
FIG. 3 is an elevation view of an article being welded by a process according to the disclosure.

Referring to FIG. 3, in one embodiment, the second directed weld energy 32 fully penetrates the article 41, forming a keyhole 301 therein. The keyhole 301 is an opening surrounded by the common molten pool 303 and extending through the article 41 to a distal surface 305. The second directed weld energy 32 generates heat, melting material and forming the common molten pool 303 from a molten pool liquid 507. The keyhole 301 is maintained at a predetermined area to prevent the common molten pool 303 from flowing out of the keyhole 301. The second directed weld energy 32 forms the keyhole 301 using any suitable amount of power. Suitable amounts of power include, but are not limited to, between about 1 kilowatt and 20 kilowatts, between about 1 kilowatt and about 15 kilowatts, between about 5 kilowatts and about 15 kilowatts, or any combination, sub-combination, range, or sub-range.

Figure 4:
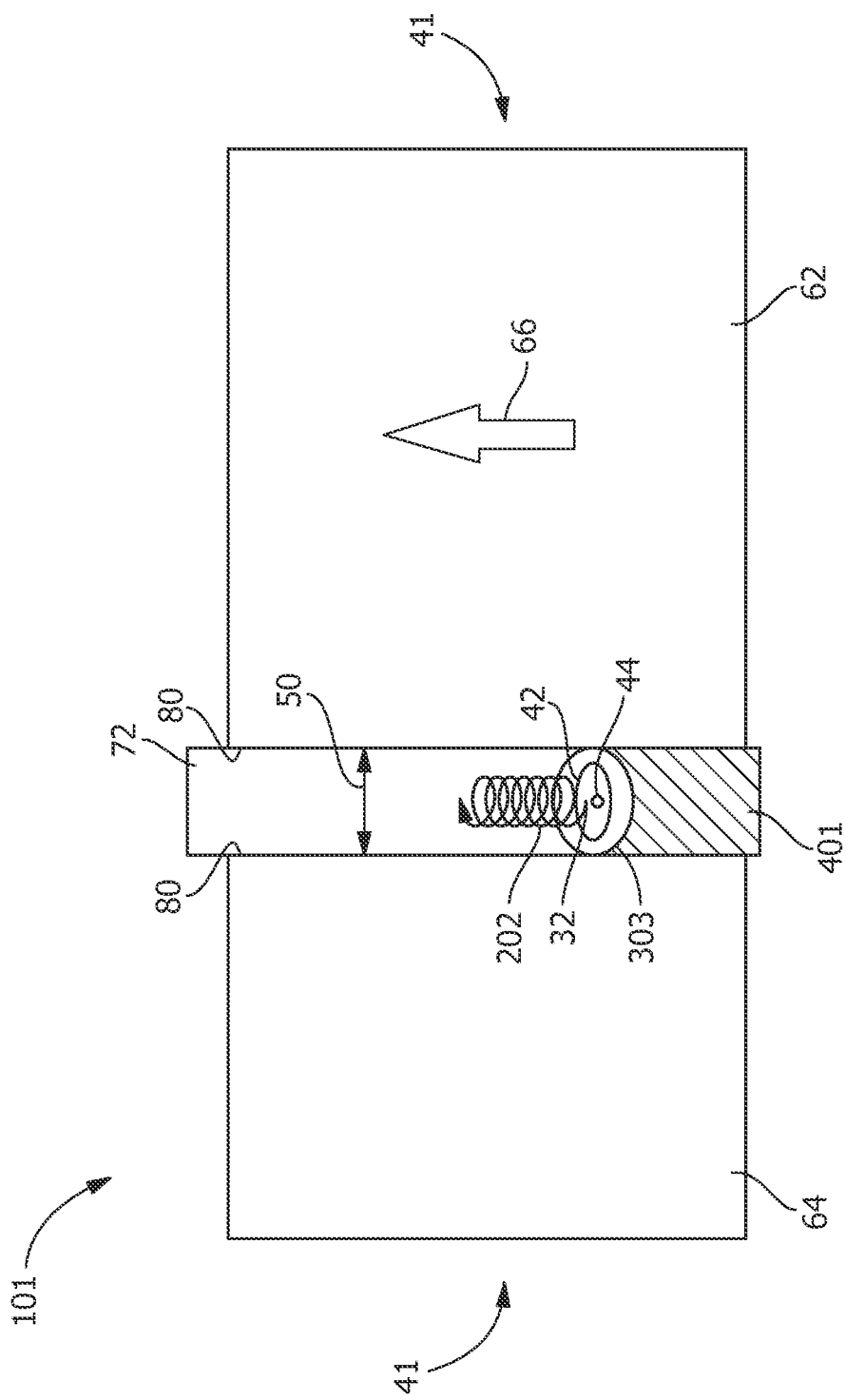
FIG. 4 is a top view of a welding system according to the disclosure.

Referring to FIG. 4, in one embodiment the first directed weld energy 44, the weld arc 42 and the rotating of the second directed weld energy 32 form a weld 401 in the article 41 as the welding process 101 proceeds in the weld direction 66. The weld 401 fills the gap 50 as the welding process 101 proceeds in the weld direction 66. In one embodiment, a gap face 80 of the first workpiece 62 and/or the second workpiece 64 is melted to provide the molten pool liquid 507 (FIG. 3), which forms the common molten pool 303. In a further embodiment, the consumable wire electrode 72 is melted to provide an increased amount of material in the molten pool liquid 507. The increase in material in the molten pool liquid 507 in the common molten pool 303 contributes to an increased protrusion 505 (FIG. 5) of the molten pool liquid 507 on the distal surface 305 (FIG. 3) in relationship with the welding system 10.

Figure 5:
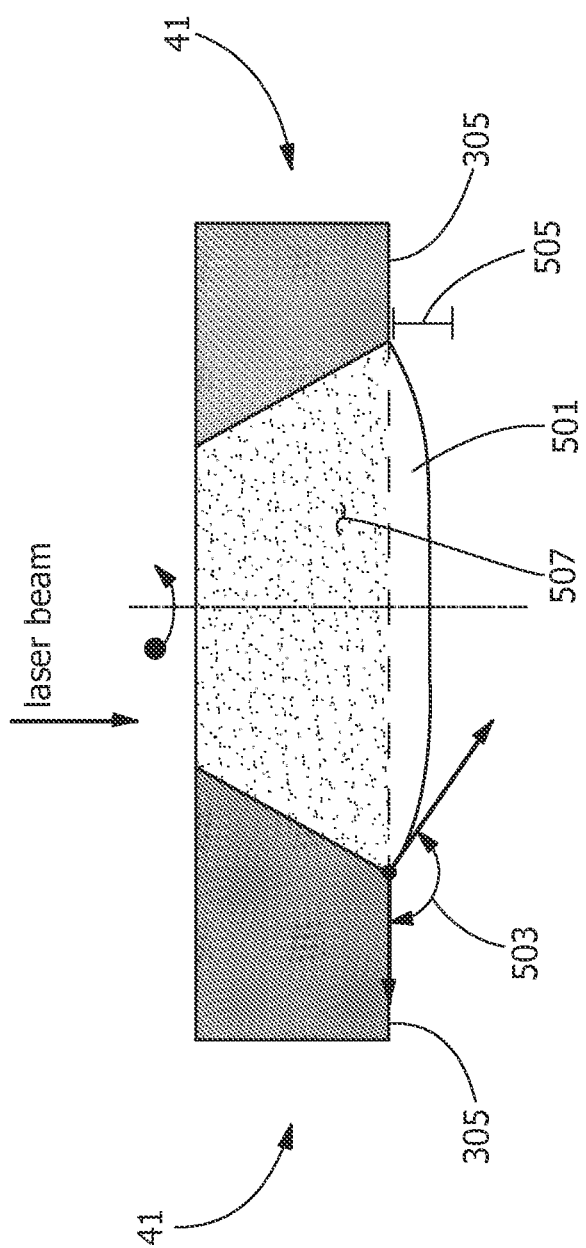
FIG. 5 is an enlarged view of a weld from a welding process according to the disclosure.

Referring again to FIG. 3, in one embodiment, the rotation of the second directed weld energy 32 along the rotation path 202 causes the keyhole 301 to rotate. As the keyhole 301 rotates, it causes a stirring of the common molten pool 303 which generates a centrifugal force on the molten pool liquid 507. Referring to FIG. 5, the centrifugal force increases a contact angle 503 between the article 41 and the molten pool liquid 507. The increase of the contact angle 503, resulting from the centrifugal force generated by the rotatable fusion apparatus 30, correlates with a decreased protrusion 505 of the molten pool liquid 507 from the distal surface 305. Cooling of the molten pool liquid 507 forms the geometry of a root reinforcement 501. In one embodiment, the cooling of the molten pool liquid 507 on the distal surface 305 forms a predetermined geometry for the root reinforcement 501, for example, being substantially planar, being planar, indiscernibly concave or convex, or a combination thereof. Additionally, the rotation of the second directed weld energy 32 increases a re-entrant angle of the weld and permits an escape of gases 307 from the common molten pool 303.

In one embodiment, the distal surface 305, as is shown in FIG. 5, is inaccessible, for example, being on an interior portion of a pipe. The lack of access prevents reworking from being performed on the root reinforcement 501 formed on the interior portion of the pipe.

Figure 6:
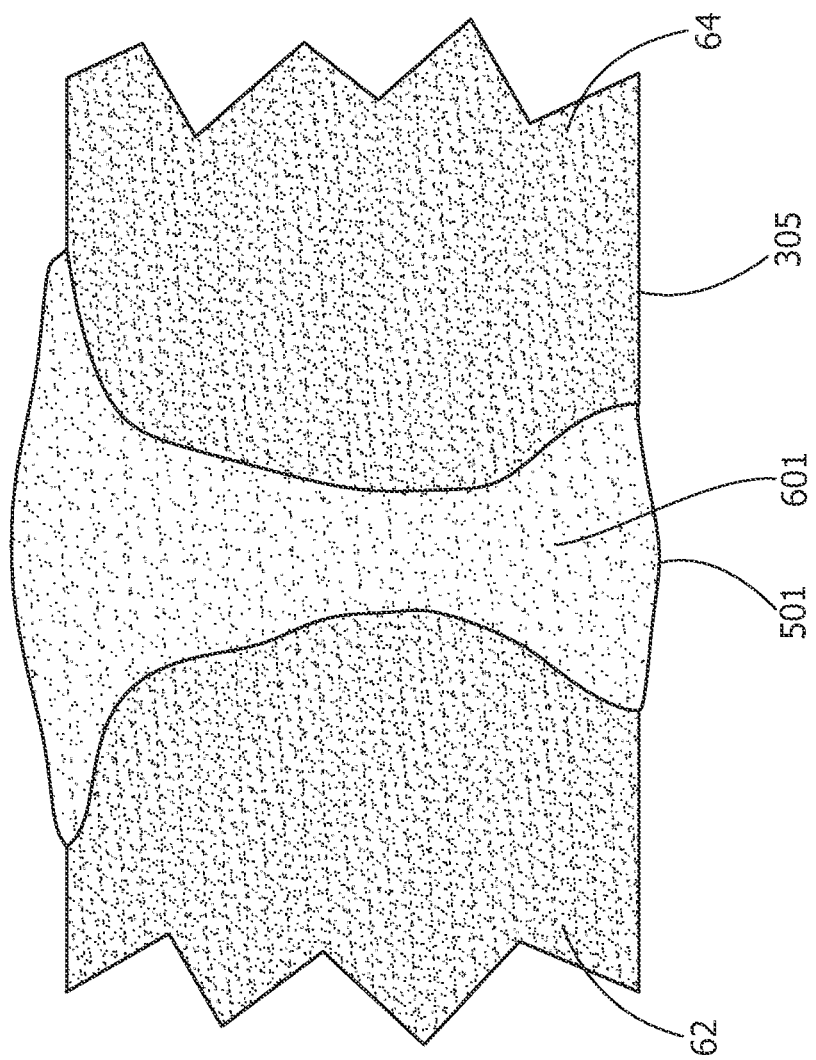
FIG. 6 is a cross-sectional view of a welded article according to the disclosure.

Referring to FIG. 6, in one embodiment, the welding system 10 is capable of producing a welded article 601 from the first workpiece 62 and the second workpiece 64 that is substantially devoid of or devoid of turbulent features that interrupt flow, such as laminar flow, of fluids. In a further embodiment, the welded article 601 is formed without reworking, machining, peening, or modifying of the root reinforcement 501 on the welded article 601. For example, in one embodiment, the root reinforcement 501 is devoid of features in the distance 505 extending beyond being coplanar with the distal surface 305, for example, up to about 0.075 inches, up to about 0.070 inches, up to about 0.065 inches, between about 0.0005 inches and about 0.075 inches, between about 0.005 inches and about 0.075 inches, between about 0.01 inches and about 0.075 inches, or any suitable combination, sub-combination, range, or sub-range therein. Additionally, a width of the root reinforcement 502 is between about 0.050 inches and about 0.250 inches, between about 0.060 inches and about 0.200 inches, between about 0.065 inches and about 0.180 inches, or any combination, sub-combination, range, or sub-range thereof.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A welding process, comprising:
generating a first directed weld energy from a first fusion apparatus and a second directed weld energy from a second fusion apparatus;
directing the first directed weld energy toward an article and the second directed weld energy toward the article such that the second directed weld energy rotates along a rotation path on the article to form a common molten pool on the article; and
directing the first fusion apparatus and the second fusion apparatus to proceed in a weld direction;
wherein the first directed weld energy and the second directed weld energy form a weld in the article; and
wherein the second fusion apparatus comprises a laser and the second directed weld energy is a laser energy; and
wherein the second directed weld energy forms a keyhole in the article and rotates the keyhole to generate a centrifugal force on a molten pool liquid forming the keyhole to increase a contact angle between the article and the molten pool liquid.

2. The welding process of claim 1, wherein a power of the laser is between 1 kilowatt and 20 kilowatts.

3. The welding process of claim 1, wherein the first fusion apparatus comprises an arc welder.

4. The welding process of claim 1, comprising including a consumable material on the article to form the weld.

5. The welding process of claim 1, wherein the second directed weld energy is rotated by a rotary lens.

6. The welding process of claim 1, wherein a rotation speed of the second directed weld energy is constant throughout the welding process.

7. The welding process of claim 6, wherein the rotation speed is between 10 rotations per minute and 60,000 rotations per minute.

8. The welding process of claim 1, wherein a rotation diameter of the second directed weld energy is constant throughout the welding process.

9. The welding process of claim 1, wherein a rotation diameter of the second directed weld energy is adjusted for varying joint gaps throughout the welding process.

10. The welding process of claim 9, wherein the rotation diameter is between 0.05 mm and 5 mm.

11. The welding process of claim 1, wherein a rotation of the second directed weld energy permits an escape of gases from the common molten pool.

12. The welding process of claim 1, wherein a rotation of the second directed weld energy generates centrifugal force applied to the common molten pool.

13. The welding process of claim 1, wherein a rotation of the second directed weld energy reduces or eliminates formation of a weld root reinforcement.

14. The welding process of claim 1, wherein the welding process is a hybrid welding process and the first fusion apparatus is selected from the group consisting of a plasma beam welding device, an electric arc welding device, a gas tungsten arc welding device, a gas metal arc welding device, and a combination thereof.

15. The welding process of claim 1 further comprising positioning a consumable wire electrode to form into filler material by interaction of the first directed weld energy and the second directed weld energy and to fill a concavity in the article, resulting in a substantially planar geometry on the article.

16. A welding process, comprising:
generating an arc energy from an arc welder and a laser energy from a laser;
directing the arc energy toward an article and directing the laser energy to rotate along a rotation path on the article to form a common molten pool on the article; and
directing the arc energy and the laser energy toward the common molten pool to generate a centrifugal force on the common molten pool to increase a contact angle between the article and the molten pool such that a weld formed from the common molten pool has a root reinforcement devoid of features extending beyond a distance beyond coplanar with a distal surface of the article of 0.065 inches.

17. A welding process, comprising:
generating an arc energy from an arc welder and a laser energy from a laser;
directing the arc energy toward an article and directing the laser energy to rotate along a rotation path on the article to form a common molten pool on the article and to fully penetrate the article and form a keyhole surrounded by the common molten pool; and directing the arc energy and the laser energy toward the common molten pool to cause the keyhole to rotate such that a distal surface of the article including a weld formed from the common molten pool is devoid of turbulent features.

\* \* \* \* \*